US010437215B2

(12) United States Patent
Hubauer et al.

(10) Patent No.: US 10,437,215 B2
(45) Date of Patent: Oct. 8, 2019

(54) METHOD AND SYSTEM FOR PERFORMING A CONFIGURATION OF AN AUTOMATION SYSTEM

(71) Applicant: Siemens Aktiengesellschaft, München (DE)

(72) Inventors: Thomas Hubauer, Garching bei München (DE); Steffen Lamparter, Feldkirchen (DE); Mikhail Roshchin, München (DE); Ulli Waltinger, Neuburg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 218 days.

(21) Appl. No.: 15/513,621

(22) PCT Filed: Sep. 25, 2014

(86) PCT No.: PCT/EP2014/070522
§ 371 (c)(1),
(2) Date: Mar. 23, 2017

(87) PCT Pub. No.: WO2016/045735
PCT Pub. Date: Mar. 31, 2016

(65) Prior Publication Data
US 2017/0293276 A1 Oct. 12, 2017

(51) Int. Cl.
G05B 19/18 (2006.01)
G05B 19/042 (2006.01)
(Continued)

(52) U.S. Cl.
CPC ..... G05B 19/042 (2013.01); G06F 16/24522 (2019.01); G06F 16/367 (2019.01); G05B 2219/13023 (2013.01)

(58) Field of Classification Search
CPC ........ G05B 19/042; G05B 2219/13023; G06F 17/30734; G06F 17/3043
See application file for complete search history.

(56) References Cited

U.S. PATENT DOCUMENTS 5,083,117 A * 1/1992 Hoigaard ............. G01R 31/026
324/510
5,865,756 A * 2/1999 Peel .................... A61B 5/02116
600/485
(Continued)

FOREIGN PATENT DOCUMENTS

EP 1380908 A2 1/2004

OTHER PUBLICATIONS

International Search Report and Written Opinion for PCT Application No. PCT/EP2014/070522, dated Jul. 7, 2015.

Primary Examiner — Khoi H Tran
Assistant Examiner — Jorge O Peche
(74) Attorney, Agent, or Firm — Schmeiser, Olsen & Watts, LLP

(57) ABSTRACT

A configuration system and method adapted to perform a configuration or reconfiguration of applications run by an automation system, the configuration system including a processing unit adapted to process at least one natural language statement of a user requirement input by a user concerning a control and/or monitoring functionality of the automation system based on a user ontology of the user and/or an automation system ontology of the automation system to generate a formal requirements specification, and a matching unit adapted to match the generated formal requirements specification and formal component specifications read from a component library to derive a configuration deployment including one or several suitable components with configurations fulfilling the input user requirement.

15 Claims, 8 Drawing Sheets

(51) Int. Cl.
   *G06F 16/36*   (2019.01)
   *G06F 16/2452*   (2019.01)

(56) References Cited

U.S. PATENT DOCUMENTS

| | | | | |
|---|---|---|---|---|
| 5,895,359 | A * | 4/1999 | Peel | A61B 5/02225 600/494 |
| 5,931,790 | A * | 8/1999 | Peel | A61B 5/02225 600/494 |
| 8,793,198 | B1 * | 7/2014 | Thomas | G06N 20/00 706/12 |
| 9,854,324 | B1 * | 12/2017 | Panchaksharaiah | H04N 21/4884 |
| 10,049,658 | B2 * | 8/2018 | Pinto | G10L 15/20 |
| 10,262,319 | B1 * | 4/2019 | Benkreira | G06Q 20/354 |
| 2002/0005787 | A1 * | 1/2002 | Gabai | H04B 1/202 340/12.29 |
| 2003/0004728 | A1 * | 1/2003 | Keiller | G06F 3/16 704/275 |
| 2003/0154077 | A1 * | 8/2003 | Tahara | G10L 15/10 704/239 |
| 2005/0209845 | A1 * | 9/2005 | Bennett | G06F 9/454 704/8 |
| 2007/0237337 | A1 * | 10/2007 | Mah | H04R 5/04 381/77 |
| 2011/0082698 | A1 * | 4/2011 | Rosenthal | A61B 5/11 704/270.1 |
| 2012/0011141 | A1 * | 1/2012 | Park | G06F 16/3349 707/769 |
| 2012/0011458 | A1 * | 1/2012 | Xia | G06F 3/04847 715/771 |
| 2013/0297548 | A1 * | 11/2013 | Cescolini | G06N 5/00 706/46 |
| 2013/0325453 | A1 * | 12/2013 | Levien | G10L 21/00 704/201 |
| 2013/0326347 | A1 * | 12/2013 | Albright | G06F 9/454 715/265 |
| 2013/0329921 | A1 * | 12/2013 | Salsman | H04S 7/303 381/303 |
| 2014/0006929 | A1 * | 1/2014 | Swartz | G06F 3/0237 715/234 |
| 2014/0122088 | A1 * | 5/2014 | Lee | G10L 15/00 704/275 |
| 2014/0129005 | A1 * | 5/2014 | Weatherhead | G06F 21/6227 700/86 |
| 2014/0156638 | A1 * | 6/2014 | Joshi | G06F 16/254 707/722 |
| 2014/0350924 | A1 * | 11/2014 | Zurek | G10L 15/22 704/231 |
| 2016/0012465 | A1 * | 1/2016 | Sharp | G06Q 20/18 705/14.17 |
| 2016/0170959 | A1 * | 6/2016 | Niles | G06F 17/275 713/100 |
| 2016/0173049 | A1 * | 6/2016 | Mehta | H03G 3/32 381/57 |
| 2017/0007167 | A1 * | 1/2017 | Kostic | A61B 5/4064 |
| 2017/0046309 | A1 * | 2/2017 | Hubauer | G05B 19/0425 |
| 2017/0065757 | A1 * | 3/2017 | Tanenbaum | A61M 1/14 |
| 2017/0133009 | A1 * | 5/2017 | Cho | G10L 15/183 |
| 2017/0203221 | A1 * | 7/2017 | Goslin | G10L 21/003 |
| 2017/0277906 | A1 * | 9/2017 | Camenisch | G06F 21/6227 |
| 2017/0347348 | A1 * | 11/2017 | Masaki | H04W 72/0406 |
| 2017/0365101 | A1 * | 12/2017 | Samec | G02B 27/017 |
| 2018/0018959 | A1 * | 1/2018 | Des Jardins | G10L 15/005 |
| 2018/0146307 | A1 * | 5/2018 | Petersen | H04R 25/552 |
| 2018/0150815 | A1 * | 5/2018 | Mocko | G06Q 20/20 |
| 2018/0158365 | A1 * | 6/2018 | Roche | G09B 5/067 |
| 2018/0240261 | A1 * | 8/2018 | Tadi | G06T 13/40 |
| 2018/0286391 | A1 * | 10/2018 | Carey | G10L 15/22 |
| 2018/0329608 | A1 * | 11/2018 | Krishnasamy | G06F 9/454 |
| 2018/0329615 | A1 * | 11/2018 | Krishnasamy | G06F 3/04847 |
| 2018/0335903 | A1 * | 11/2018 | Coffman | G06F 3/0482 |

* cited by examiner

```
@prefix xsd: <http://www.w3.org/2001/XMLSchema#>
[]
a sp:Select ;
  sp:groupBy (_:b1) ;
  sp:resultVariables
  {[
      sp:expression
      [
        a sp:Count ;
          sp:expression
          [
              sp:varName "eventtext"^^xsd:string
          ]
      ] ;
      s:varName "count"^^xsd:string
   ] -:b1) ;
  sp:where
  {[
      sp:object  -:b1 ;
      sp:predicate data:hasEventtext ;
      sp:subject
      [
          sp:varName "message"^^xsd:string
      ]

])
  -:b1  sp:varName "eventtext"^^xsd:string
```

PREFIX data: <http://www.example.org/data#>

SELECT ((COUNT(?eventtext)) as ?count) ?eventtext
WHERE
{
    ?message a data:Message .
    ?message data:hasEventtext ?eventtext .
    ?message data:forTurbine ?turbine .
    FILTER(?turbine = <http://www.example.org/data#tubine1> ||
           ?turbine = <http://www.example.org/data#tubine2>)
}
GROUP BY ?eventtext
LIMIT 10

METHOD AND SYSTEM FOR PERFORMING A CONFIGURATION OF AN AUTOMATION SYSTEM

CROSS-REFERENCE TO RELATED APPLICATIONS

This application claims priority to PCT Application No. PCT/EP2014/070522, having a filing date of Sep. 25, 2014, the entire contents of which are hereby incorporated by reference.

FIELD OF TECHNOLOGY

The following relates to a method and a system for performing a configuration or reconfiguration of applications running on an automation system, in particular, monitoring and/or control applications.

BACKGROUND

Setting up an automation system requires the configuration, reconfiguration or customization of standard control and monitoring applications with relation to customer-specific requirements. These applications can comprise a wide variety of different applications such as planning applications, control applications or diagnostic applications. The configuration and/or reconfiguration of these applications within a complex automation system comprising a plurality of automation entities is laborious and time-consuming. Moreover, the engineering, configuration and/or reconfiguration of a complex automation system is complicated by the fact that the automation system configuration or customization requires users with a deep domain knowledge of the specific technical domain as well as users with a technical expertise about the automation entities of the automation system and the components or software components running on the automation entities of the automation system. The collaboration of such multi-disciplinary teams comprising different users with different experience increases the complexity of the configuration or customization process and leads also to technically suboptimal solutions or configurations. The complexity of the automation system and its plurality of automation entities requires high efforts when updating software components of the automation system once the user requirements for the underlying automation system do change.

SUMMARY

An aspect relates to providing a method and system for performing a configuration or reconfiguration of an automation system which overcomes the above-mentioned drawbacks and which allows a relatively fast and reliable configuration and/or reconfiguration of the automation system by a user with a limited domain knowledge and/or technical expertise about automation entities of the automation system.
T
Embodiments of the invention provide, according to a first aspect, a method for performing a configuration or reconfiguration of an automation system, comprising the steps of: processing at least one natural language statement of a user requirement input by a user concerning a control and/or monitoring functionality of the automation system based on a user ontology of the user and an automation system ontology of the automation system to generate a formal requirements specification, and matching the generated formal requirements specification and formal component specifications read from a component library to derive a configuration deployment comprising one or several suitable components with configurations fulfilling the input user requirement.

The method according to the first aspect of the present embodiments of the invention applies model-based natural language engineering to automation system software.

In a possible embodiment of the method according to the first aspect of the present invention, the natural language statement is input by the user via a user interface in written language.

In a further possible embodiment of the method according to the first aspect of the present invention, the natural language statement is input by the user via the user interface in spoken language.

In a still further possible embodiment of the method according to the first aspect of the present invention, the component library comprises software components each having meta data describing a functionality and/or constraints of the respective software component.

In a still further possible embodiment of the method according to the first aspect of the present invention, the user ontology comprises a user vocabulary used by a user for formulating a natural language statement.

In a further possible embodiment of the method according to the first aspect of the present invention, the automation system ontology comprises a system vocabulary describing elements and/or relations between elements and/or entities of the automation system.

In a still further possible embodiment of the method according to the first aspect of the present invention, the generated formal requirements specification comprises a SPARQL query.

In a still further possible embodiment of the method according to the first aspect of the present invention, the generated formal requirements specification comprises a statement formalized using an OWL ontology.

In a still further possible embodiment of the method according to the first aspect of the present invention, the derived configuration deployment comprises at least one adapted or parameterized software component read from the component library and/or at least one generated executable software component fulfilling the input user requirement.

In a still further possible embodiment of the method according to the first aspect of the present invention, the processing of the natural language statement input by the user comprises splitting the natural language statement into syntactic markers and tokens, matching the tokens with entries in the user ontology of the user and/or with entries in the automation system ontology of the automation system to extract information of automation system entities mentioned in the natural language statement, and generating the formal requirements specification using the extracted information of the mentioned automation system entities.

In a still further possible embodiment of the method according to the first aspect of the present invention, if no entry for a token is found in the user ontology and/or in the automation system ontology, the respective token is checked against entries in a lexicon stored in a database.

In a still further possible embodiment of the method according to the first aspect of the present invention, if no entry for the respective token in the lexicon is found, possible synonyms of the token are derived and checked against entries in the lexicon.

In a still further possible embodiment of the method according to the first aspect of the present invention, after identification of the token or its synonym in the lexicon, a corresponding formal rule is extracted and merged in a SPARQL query body with the information extracted from the user ontology and/or the automation system ontology to generate the formal requirements specification.

In a still further possible embodiment of the method according to the first aspect of the present invention, the configured or reconfigured applications of the automation system are visualized to the user via a user interface.

In a still further possible embodiment of the method according to the first aspect of the present invention, a specific user or a specific user group is identified on the basis of the input natural language statement of the user and a corresponding user ontology is loaded from a database.

In a still further possible embodiment of the method according to the first aspect of the present invention, the at least one component of the configuration deployment calculates key performance indicators of the automation system and/or retrieves data from automation entities of the automation system and/or supplies data to automation entities of the automation system.

Accordingly, embodiments of the invention provide a configuration system adapted to perform a configuration or reconfiguration of applications run by an automation system, said configuration system comprising: a processing unit adapted to process at least one natural language statement of a user requirement input by a user concerning a control and/or monitoring functionality of said automation system based on a user ontology of the user and/or an automation system ontology of the automation system to generate a formal requirements specification; and a matching unit adapted to match the generated formal requirements specifications and formal component specifications read from a component library to derive a configuration deployment comprising one or several suitable components with configurations fulfilling the input user requirement.

Embodiments of the invention accordingly provide an automation system comprising a plurality of automation entities and a configuration system adapted to perform a configuration or reconfiguration of applications run by the automation system, wherein the configuration system comprises processing unit adapted to process at least one natural language statement of a user requirement input by a user via a user interface concerning a control and/or monitoring functionality of the automation system based on a user ontology of the user and/or an automation system ontology of the automation system stored in a database to generate a formal requirements specification and a matching unit adapted to match the generated formal requirements specification and formal component specifications read from a component library to derive a configuration deployment comprising one or several suitable components with configurations fulfilling the input user requirements, wherein the at least one component of the derived configuration deployment is adapted to calculate key performance indicators of the automation system and/or to retrieve data from automation entities of the automation system and/or to supply data to automation entities of the automation system.

Embodiments of the invention further provide according to a fourth aspect a configuration tool for an automation system adapted to perform the method according to the first aspect of the present invention.

BRIEF DESCRIPTION

Some of the embodiments will be described in detail, with reference to the following figures, wherein like designations denote like members, wherein.

DETAILED DESCRIPTION

Figure 1:
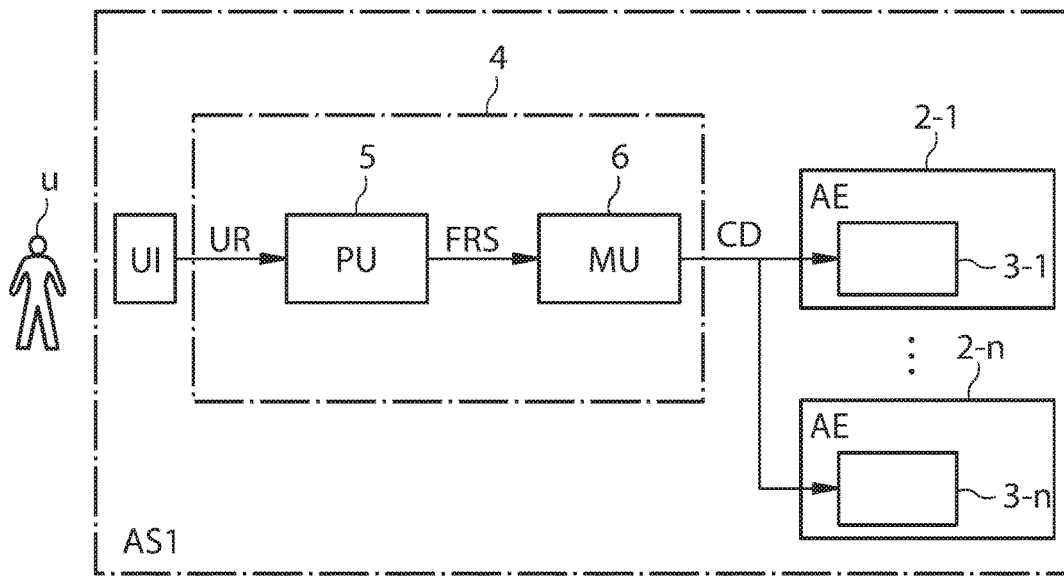
FIG. 1 shows a block diagram for illustrating an exemplary embodiment of an automation system.

FIG. 1 illustrates schematically an exemplary embodiment of a complex automation system 1 which can comprise a plurality of automation entities 2-1, 2-2, . . . 2-n, wherein at least some of the automation entities run or execute automation components 3-1, 3-2, . . . 3-n. These components 3-i are software components which can perform a control and/or monitoring functionality in the automation system 1. The automation entities 2-i can for example be formed by controllers, sensors, actuators or other entities. The applications run by the automation entities 2-i can perform different functions such as retrieving data from the automation system 1 or providing data supplied to automation entities 2-i of the automation system 1.

The automation system 1 comprises or is connected to a configuration system 4 as illustrated in FIG. 1. The configuration system 4 comprises a processing unit 5 adapted to process at least one natural language, NL, statement of a user requirement input by a user U concerning a control and/or monitoring functionality of the automation system 1 based on a user ontology UO of the user and/or an automation system ontology ASO of the automation system 1 stored in a database to generate a formal requirements specification FRS. An ontology is a specification of a conceptualization. It covers conceptual representations and their relations. It can be evaluated as a knowledge representation on an abstract level. The configuration system 4 further comprises a matching unit 6 adapted to match the generated formal requirements specification FRS and formal component specification FCS read from a component library CL to derive a configuration deployment CD comprising one or several suitable components with configurations fulfilling the input of user requirement UR. Both FRS and FCS are subsets of the user ontology UO that defines the concept and relations with regard to requirements, or in the later case with regard to components, i. e. which component is related to which other components, products, assemblies or sensors.

Figure 9:
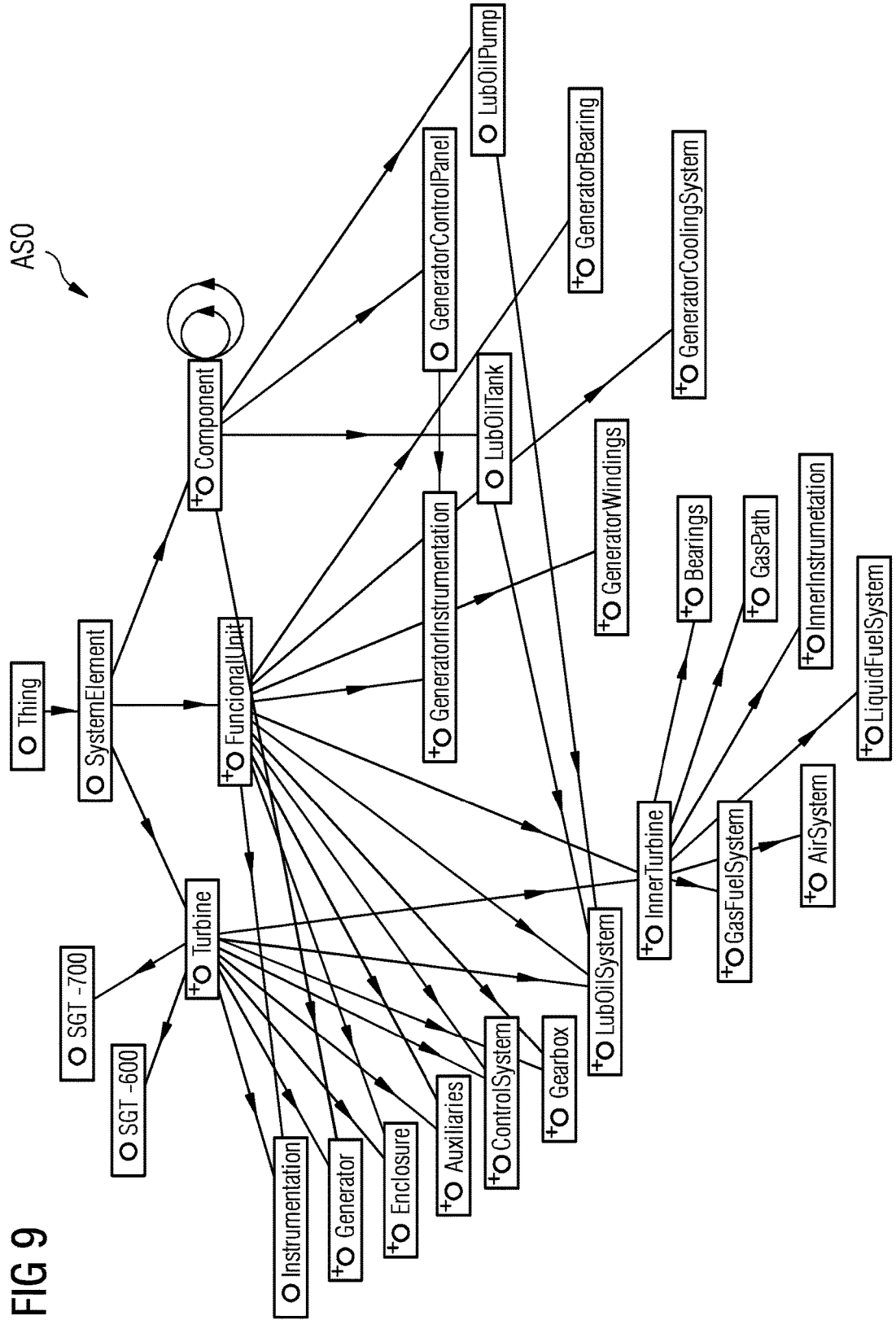
FIG. 9 illustrates an exemplary embodiment of an automation system ontology used by the method and/or system.
Figure 10:
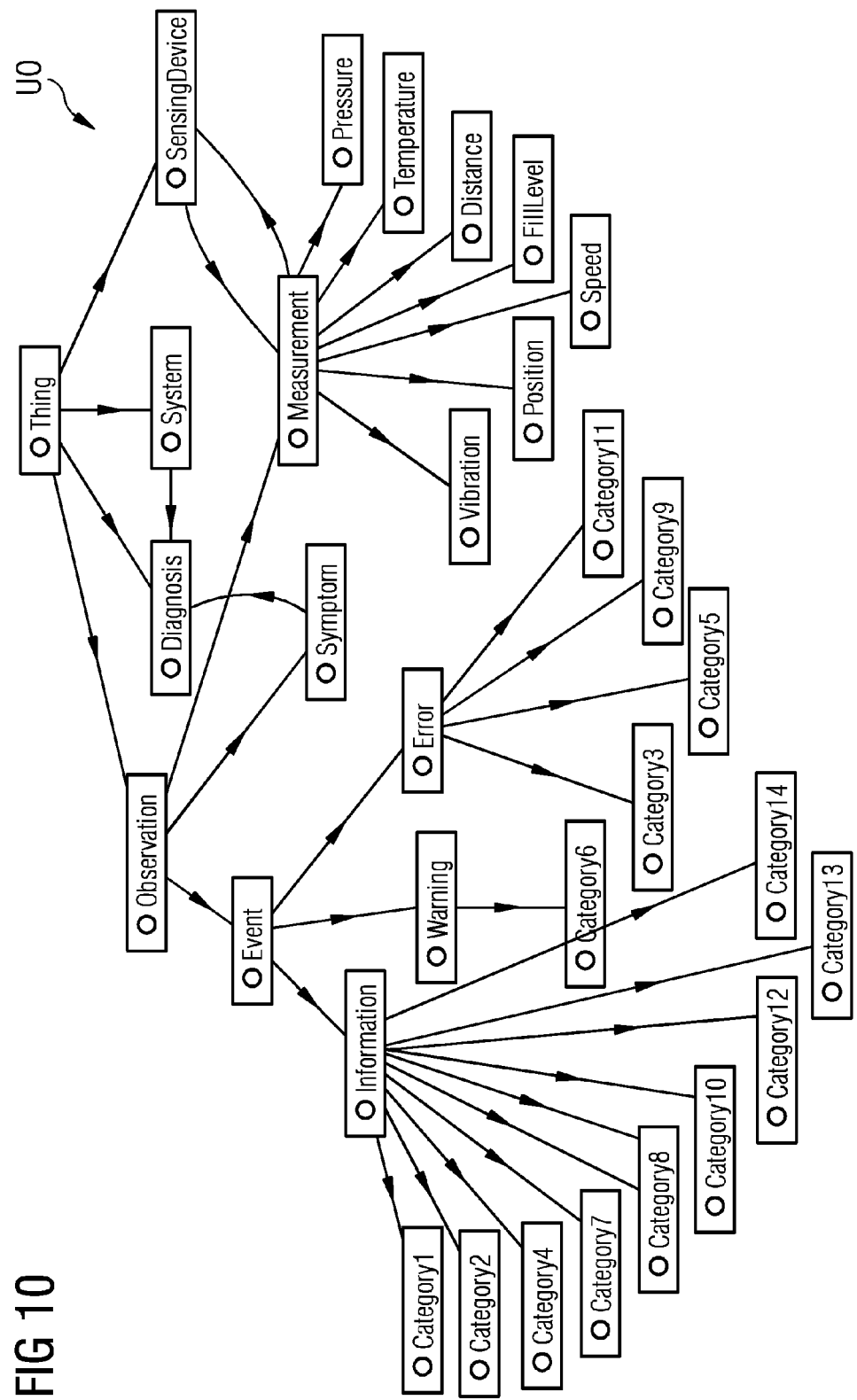
FIG. 10 illustrates an exemplary embodiments of a user ontology used by the method and/or system.

As shown in FIG. 1, a user U can input at least one natural language statement via a user interface UI connected to the processing unit 5. Such a natural language NL statement can be a written natural language statement input by the user U into a keyboard or into a graphical user interface. In a further possible embodiment, the natural language statement can be spoken language input into a microphone of the user interface UI. The processing unit 5 has access to a user ontology UO of the user and an automation system ontology ASO of the automation system 1. FIG. 9 illustrates as an example of an automation system ontology ASO a turbine ontology. FIG. 10 shows as an example a diagnostics ontology forming part of a user ontology of a service engineer. The user ontology UO comprises the user vocabulary used by the respective user or a user group for formulating a natural language statement. The automation system ontology ASO comprises a system vocabulary describing elements and/or relations between elements of the automation system 1.

The exemplary turbine ontology shown in FIG. 9 is designed to detail the internal organization of an appliance. There are two main aspects represented in the turbine ontology:
(i) specification of an appliance structure, i.e., its components and subcomponents,
(ii) functional purpose of each component.

The turbine ontology contains approximately 60 classes, 15 object and data properties as shown in FIG. 9. For the sake of simplicity the turbine ontology is shown partly, since unfolding all classes significantly overloads and complicates the figure.

The central class SystemElement contains three subclasses: Turbine, Component and FunctionalUnit.

Subclass Turbine models product families and contains turbines as individuals. Product families are represented as subclasses of the Turbine class and its characteristics, such as power generation, emissions and others are stored as data properties (e.g., hasPowerGeneration, hasNOxEmissions).

Subclass Component describes turbine main parts and their hierarchy, using relations such as hasPart, hasDirectPart and its inverses. The relation hasPart is a transitive relation indicating that one component is the part of the other, whereas the relation hasDirectPart is used to indicate that one component consists of several subcomponents. This relation is non-transitive.

Subclass FunctionalUnit assigns functional meaning to the components. Some of the components constitute an important functional block of an appliance, such as, GasPath, GasFuelSystem, LiquidFuelSystem, and others.

The axioms in this ontology enforce the exact structure of a piece of machinery. For instance, it is required that an appliance cannot be a component or part of anything else:
TurbineC $\sqsubseteq \neg(\exists$ isPartOf)

On the other hand, every turbine among other components and units must contain a control system, power generator and a lub oil system:
Turbine $\sqsubseteq \exists$ hasDirectPart.Control System
Turbine $\sqsubseteq \exists$ hasDirectPart. Generator
Turbine $\sqsubseteq \exists$ hasDirectPart.LubOilSystem Similar axioms are used for enforcing the structure of elements and functional units:
LiquidFuelPump $\sqsubseteq \exists$ isPartOf.LubOilSystem The exemplary diagnostics ontology shown in FIG. 10 is designed to formalize the information on turbine events and failures. There are two main aspects represented in the ontology:
(i) diagnostics information, such as a connection between specific events observed by monitoring devices, and typical symptoms of different faults of the turbine,
(ii) meta-information on the observations, such as timestamp representing the instant the observation was made, the relation between measurements and derived events, etc.

The diagnostics ontology is shown on FIG. 10. The diagnostics ontology comprises approximately 30 classes and 10 properties. The core classes are Observation and Diagnosis.

Observation has three subclasses referring to the type of observation: a measurement, an event, or a symptom. Subclass Measurement consists of sensor observations and connected with the SensingDevice class with the relation has Detected to indicate which sensor measured a certain value. Subclass Event consists of messages generated by the control unit of the turbine, which subdivide to the different categories indicating a content of a message. Symptom is an observation (event or measurement) that indicates on a certain diagnosis of the turbine.

Diagnosis is connected with the Symptom subclass with the relation indicatesAtDiagnosis and its inverse for listing certain characterizing symptoms for each diagnosis. This class is also connected with the System class with the relation hasDiagnosis to indicate a turbine or its unit that has this diagnosis.

Figure 11:
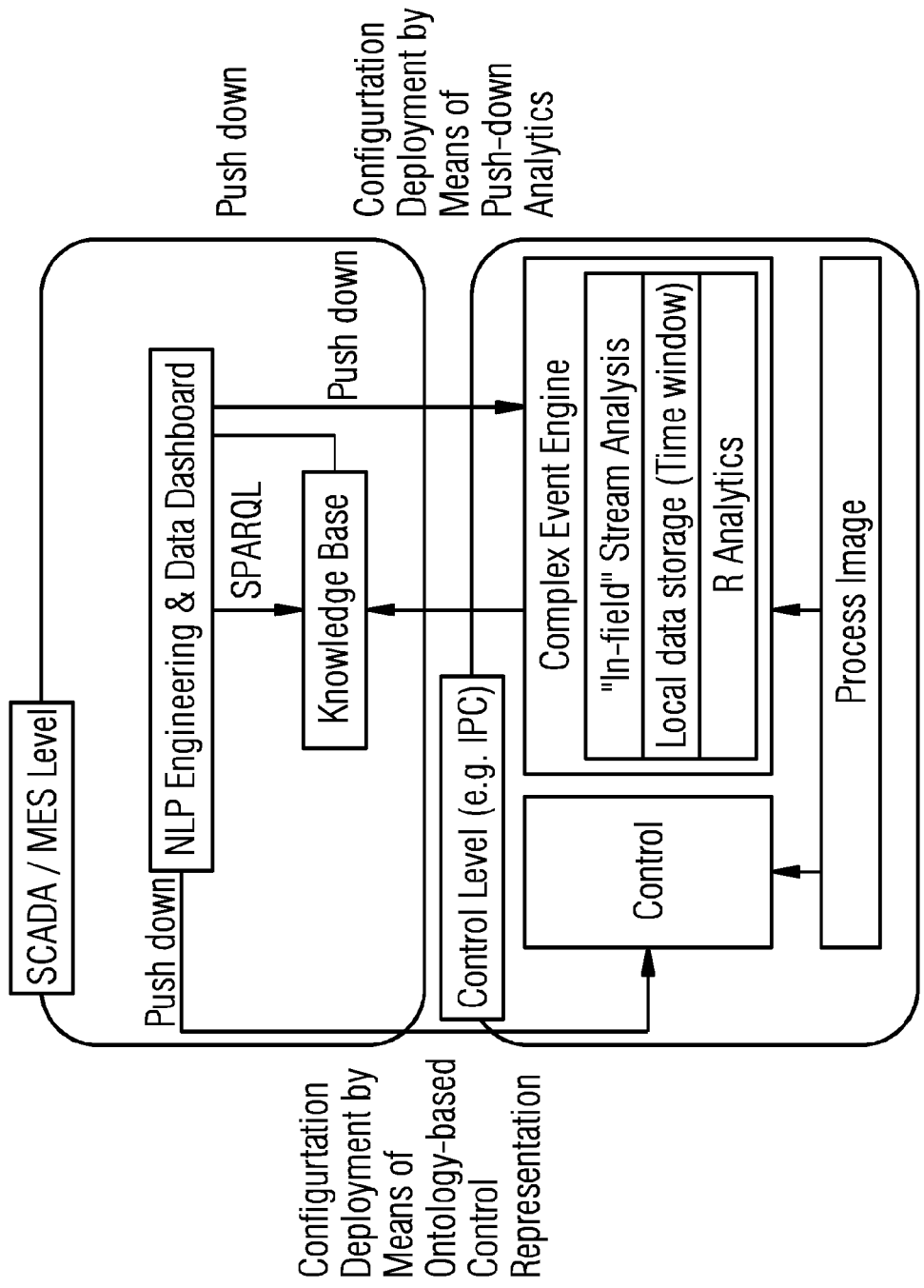
FIG. 11 illustrates an example for a configuration deployment as performed by the method and/or system, in accordance with embodiments of the present invention.

The diagnostics ontology has several axioms enforcing its structure. For instance, each diagnosis has to be assigned to some System Element, i.e. to a turbine or its unit:
Diagnosis $\sqsubseteq \exists$ hasDiagnosis$^-$.System Each diagnosis must be supported by some symptoms:
Diagnosis $\sqsubseteq \exists$ indicatesAtDiagnosis$^-$.Symptom In a possible embodiment, the generated formal requirements specification FRS can comprise a SPARQL query or a statement formalized using an OWL (web ontology language) ontology. SPARQL is a resource description framework, RDF query language which allows for a query to consist of triple patterns, conjunctions, disjunctions, and optional patterns. The derived configuration deployment CD illustrated in FIG. 1 can comprise at least one adapted or parameterized software component read from the component library CL and/or at least one generated executable software component fulfilling the input user requirements UR input by the user U. In a possible embodiment, the configured or reconfigured applications are visualized to the user U via the user interface UI. In a possible embodiment, a specific user or user group is identified by the processing unit 5 on the basis of the input natural language statement of the user U and a corresponding fitting user ontology UO is loaded from a database. The at least one component of the configuration deployment CD output by the matching unit 6 can be adapted to calculate key performance indicators KPI of the automation system 1. Further, the configuration deployment CD can also be adapted to retrieve data from automation entities 2-i of the automation system 1 and/or to supply data, in particular control data, to automation entities 2-i of the automation system 1. The configuration deployment CD can be instantiated through a so-called analytical push down. To give an example, as illustrated in FIG. 11, the user is able to define/write an R (mathematical software component—open source) script/pattern which can be "pushed down" to the system configuration. Once activated, it is configured and deployed in the backend for capturing and/or detecting events. I. e. a script could be "TemperatureDifference"=ActualTemperature−OptimalTemperature. This script is deployed within the configuration of the system (push-down). The actual configuration is changed since the R-Interpreter is activated/deployed and events that are derived by the output of the function do/could have an influence of the analysis (i.e. Root-Cause-Analysis).

The automation system 1 can be an automation system of different technical domains. For example, the automation system 1 can be a turbine monitoring and diagnostics system such as ADS or an automation system engineering tool such as TIA. Other examples for the automation system 1 are a manufacturing intelligence solutions system such as SIMATIC IT OEE, or a power grid monitoring system such as SIGUARD DSA or a fleet surveillance system such as BAS platform or a CT surveillance system.

Figure 2:
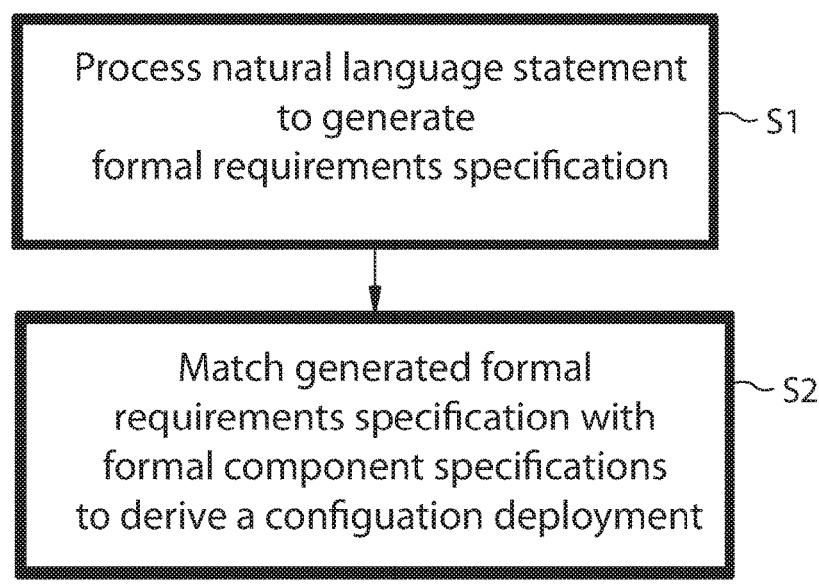
FIG. 2 shows a flow diagram of an exemplary embodiment of a method for performing a configuration or reconfiguration of an automation system.

FIG. 2 shows a flowchart of an exemplary embodiment of a method according to an aspect of the present invention. The illustrated method is adapted to perform a configuration and/or a reconfiguration of an automation system such as the automation system 1 illustrated in FIG. 1.

In a first step S1, at least one natural language statement of a user requirement input by a user concerning a control and/or monitoring functionality of the automation system 1 is processed based on a loaded user ontology UO of the user U and/or an automation system ontology ASO of the automation system 1 to generate a formal requirements specification FRS.

In a further step S2, the generated formal requirements specification FRS is matched with formal component specifications FCS read from a component library CL to derive a configuration deployment CD comprising one or several suitable components with configurations fulfilling the input user requirement UR.

The method illustrated in FIG. 2 can be implemented by a configuration tool for an automation system.

Figure 3:
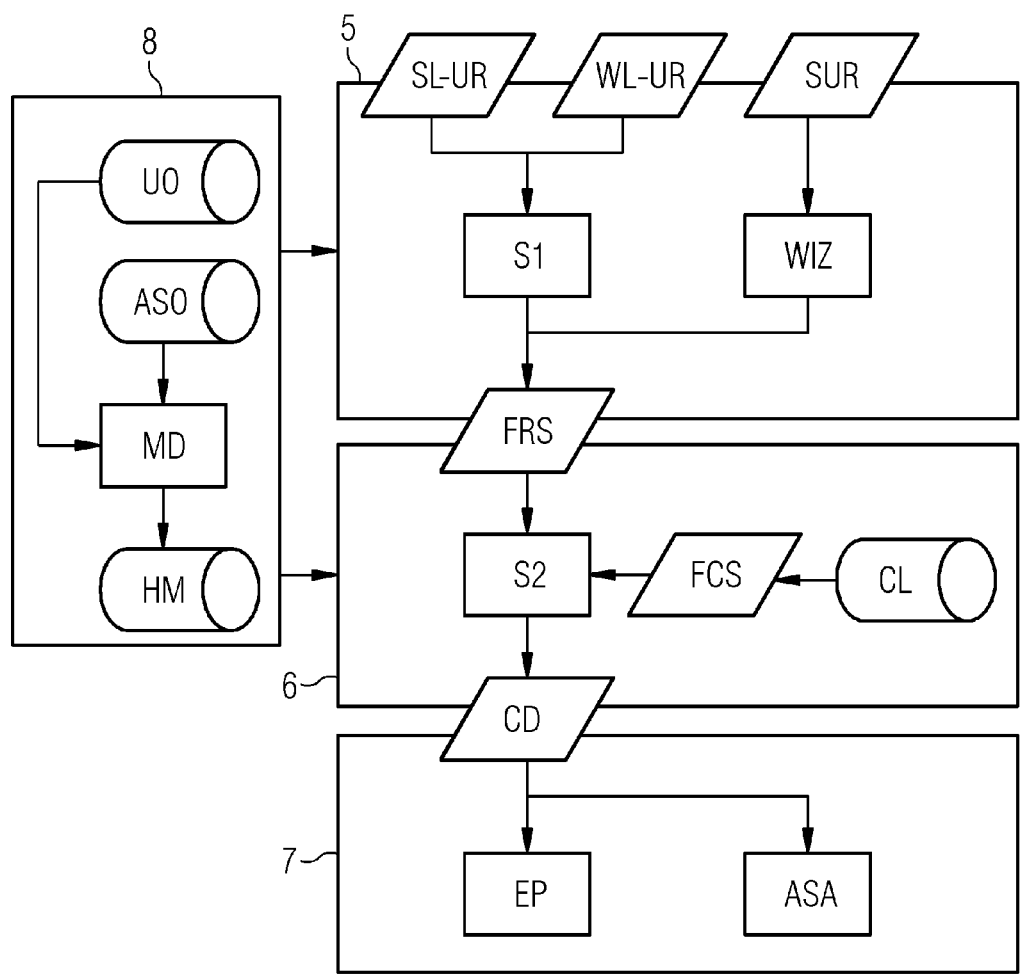
FIG. 3 shows a schematic diagram of an exemplary embodiment of a configuration system.

FIG. 3 shows a schematic diagram for illustrating an exemplary embodiment of the method and system according to the present invention.

As can be seen in FIG. 3, the illustrated system comprises a processing unit 5 which forms a requirement specification element, a matching unit 6 which forms a model-based engineering element and an execution element 7. The configuration system 1 as illustrated in the embodiment of FIG. 3 further comprises a model manager 8.

The processing unit 5 is adapted to generate a formal requirement specification FRS from a natural language user requirement input which can concern a specific automation software control or monitoring functionality. This user requirement UR can comprise at least one natural language statement in written language (WL-UR) or spoken language (SL-UR). In a possible embodiment, it is also possible for the user U to directly input a structured user requirement SUR, for instance via wizard WIZ. The resulting formal requirements specification FRS output by the processing unit 5 can be for example a SPARQL query, a statement formalized using an OWL ontology or a statement in any other well-defined, formal language.

The matching unit 6 which forms a model-based engineering element has access to a component library CL which can contain a formal description of each control or monitoring functionality provided by the underlying automation software including all configuration possibilities. The component library CL can comprise software components for calculating key performance indicators KPI of the automation system 1, software components for retrieving data from automation entities 2-i of the automation system 1 or supplying data or control instructions to specific automation entities 3-i such as field devices of the automation system 1. The matching unit 6 does access the communication library CL and is adapted to perform a matching of the received formal requirements specification FRS and formal component specifications FCS read from the component library CL to derive the configuration deployment CD comprising one or several suitable software components with configurations fulfilling the input user requirement UR. In a possible embodiment, the software components of the component library CL comprise meta data describing the respective software component which can be used for the matching with the formal requirements specification FRS. The meta data can cover the description of the component instance and synonyms. The derived configuration deployment CD can comprise a configuration deployment plan consisting of one or several suitable components with derived configurations to fulfill the user requirement UR. The execution plan EP or configuration deployment can be deployed at an execution component 7 which can be formed by one or several automation entities 2-i of the automation system 1. The derived configuration deployment or deployment execution plan EP can comprise at least one adapted or parameterized software component read from the component library CL and/or generated executable software components fulfilling the input user requirement UR. The configuration deployment CD can also be used for an automation software adaption ASA.

In a possible embodiment, the configuration system 4 further comprises a model manager 8 as illustrated in FIG. 3. The model manager 8 can be responsible for administration of formal models or ontologies capturing the user as well as the automation system vocabulary. The model manager 8 can comprise a mapping discovery element MD for automatically aligning the vocabulary of user model or user ontology UO and the automation system model or automation system ontology ASO to provide vocabulary or model mapping MM. In a possible embodiment, the mapping can be performed manually each time vocabulary definitions in the user ontology UO and/or automation system ontology ASO are updated. The method and system as illustrated in FIGS. 1, 2, and 3 allow the engineering, configuration and customization of control and monitoring applications in an automation system 1 via natural language statements which are automatically translated to a system configuration based on background models comprising formal ontologies.

An example for a natural language statement of a user U is a keyword statement such as: "Add PM-controller for heating system at steel roll". In this example, the input statement of the user U generates a standard PID control code which can be deployed at the PLC of the steel roll heating system within the automation system 1. In a possible embodiment, the user U does not input one natural language statement but several natural language statements in an interactive manner. For example, after having received the keyword statement, a dialogue window can come up for parameterization of the PID controller. In a possible embodiment, most parameters and code fragments are already generated from the underlying background ontology which e.g. identifies the right steel roll, its heating system and the corresponding PLC.

A further exemplary natural language statement of a user input by the user U via the user interface UI can be for example: "Show OEE and anomalies for line x". This input keyword statement in natural language can for instance generate a dashboard element displayed to the user that shows the KPI overall equipment efficiency (OEE) over time. In a possible embodiment, anomalies can be marked based on a historic analysis of the data.

The model manager 8 of the configuration system 1 as illustrated in FIG. 3 can instantiate the formal knowledge representation models or ontologies by parsing the ontological representation of the automation system 1. The knowledge representation can thereby be split by the model manager 8 into a list of further interconnected ontological based representations. For example, these interconnected ontological based representations can comprise a turbine ontology, a sensor ontology and a diagnostic ontology.

In an exemplary automation system 1, a turbine ontology as illustrates in FIG. 9 can specify the representation of turbines and their elements, i.e. the internal structure of a turbine. A sensor ontology can specify the representation of sensors and their devices, i.e. it can be a categorization of measuring devices which are mounted at the respective turbine. The diagnostic ontology can for instance specify the relation between the control entity and the sensing devices or sensors.

In a possible embodiment, a common user vocabulary representation can be instantiated. This knowledge representation can capture and specify the initial mapping paradigm of the natural language interface such as using gazetteers and synonym dictionaries which allow to instantiate the reference to constraints, concepts and instances of the respective turbine, sensor and diagnostic ontology.

Figure 4:
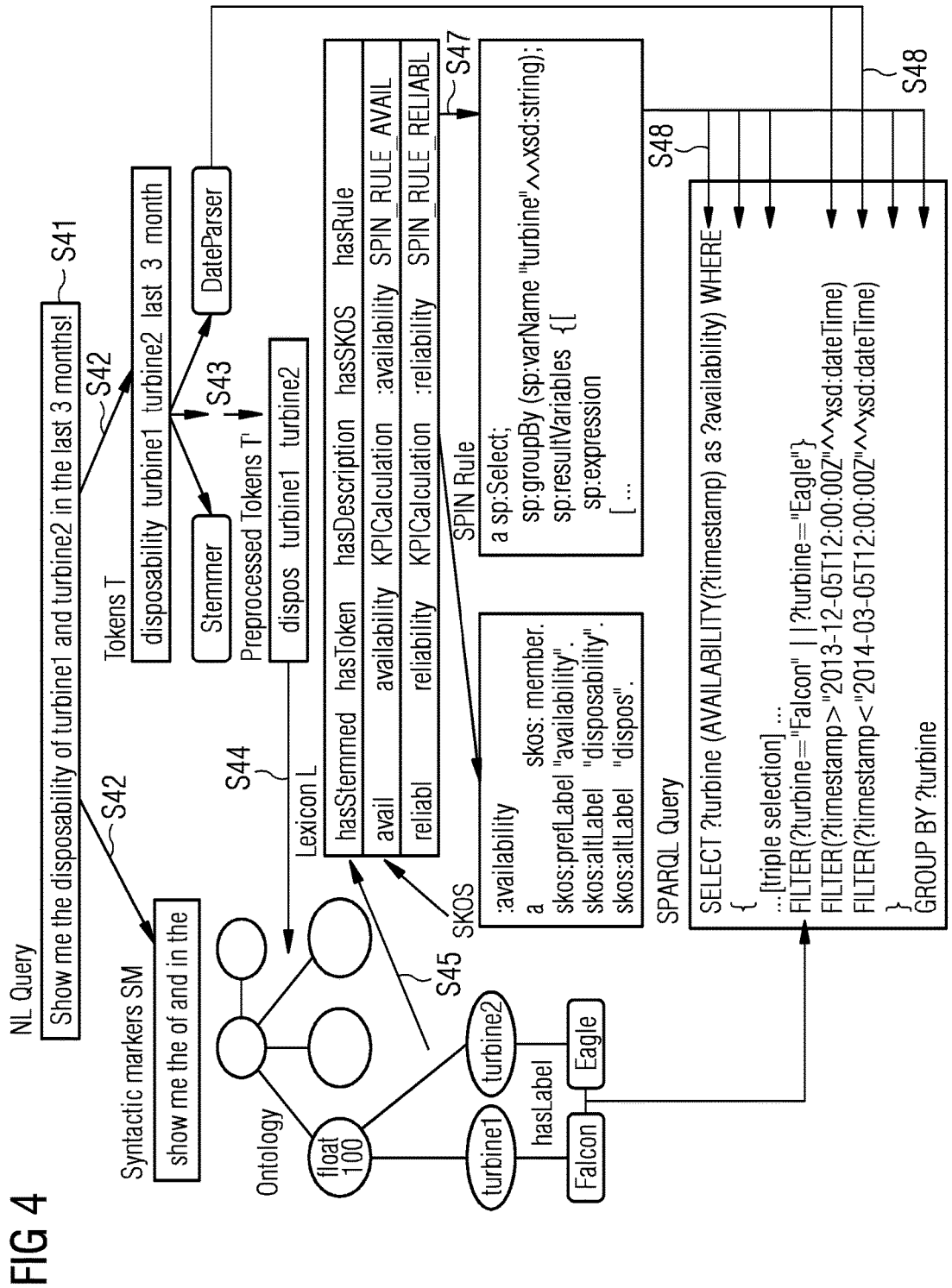
FIG. 4 shows an exemplary overview for a use case for illustrating the processing of a natural language statement performed by a method and system.

FIG. 4 shows an exemplary workflow for illustrating the processing of a natural language statement by a method and system according to embodiments of the present invention. In the shown example, the user inputs via the user interface UI a natural language statement into the processing unit 5, wherein this natural language NL query reads: "Show me the disposability of turbine1 and turbine2 in the last 3 months!". This natural language statement is input or entered by the user in step S41 shown in FIG. 4. The input natural language statement is split in step S42 between two synthetic markers SM (stop-words) and tokens T as shown in FIG. 4. The split tokens T comprise the words: "disposability, turbine1, turbine2, last and 3 months". The split synthetic markers SM comprise: "show, me, the, of, and, in, the". In a further step S43, a query interpretation on the basis of the split tokens T is performed by stemming, data parsing and a removal of punctuation to extract preprocessed tokens T' as illustrated in FIG. 4. As can be seen, the preprocessed tokens T' are without the data indications. The preprocessed tokens T' are checked in a further step S44 with at least one ontology stored in a database. The ontology comprises an automation system ontology ASO and/or a user ontology UO of the identified user U. In step S45, the concepts, individuals, relations and properties are matched to extract turbine labels of the specified turbines. If no entry for a token T' is found in the user ontology UO and/or automation system ontology ASO, the respective token T' is checked in step S45 against entries in a lexicon L stored in a database. If the respective token T' can also not be found in the lexicon L, the SKOS information is requested to identify possible synonyms in step S46 and the derived synonyms are checked again against entries in the stored lexicon L. In the given example, "availability" is found as a synonym for "disposability" used in the natural language NL statement of the user U. After having identified the token or its synonym in the ontology or the lexicon, a corresponding SPIN rule is extracted in step S47 as illustrated in FIG. 4. In the last step S48, the defined SPARQL body from the SPIN rule is merged with additional information extracted from the user ontology UO and/or the automation system ontology ASO as well received from the data parser employed in step S43 as illustrated in FIG. 4. As can be seen in FIG. 4, the natural language NL statement of the user input in step S41, is transformed into a formal requirements specification FRS formed by a SPARQL query output by the processing unit 5 to the matching unit 6.

Figures 5, 6:
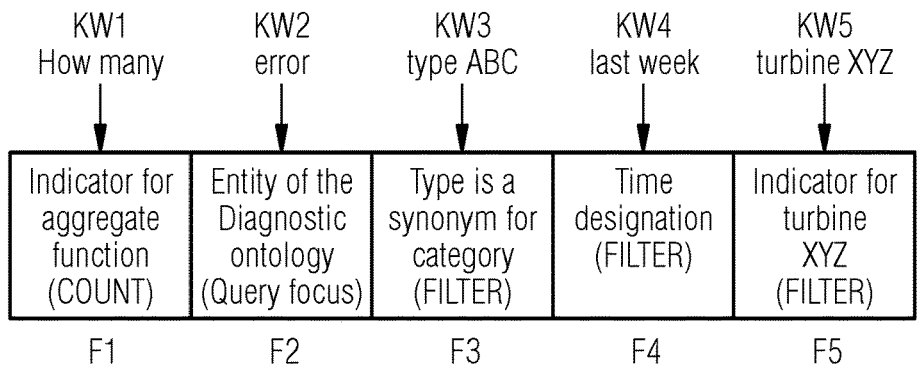
FIG. 5 illustrates a generation of a formal requirements specification from an exemplary natural language statement of a user, in accordance with embodiments of the present invention.
FIG. 6 shows an example of a formal rule used to provide a formal requirements specification, in accordance with embodiments of the present invention.

FIG. 5 shows a further example for transforming a natural language NL statement into a formal requirements specification FRS. In the given example, the keywords KW "how many (KW1), error (KW2), type ABC (KW3), last week (KW4), turbine XYZ (KW5)" of the natural language NL statement are transformed into a formal requirements specification FRS comprising several information field F. The fields comprise an indicator for aggregate function (count) F1, an entity for the diagnostics ontology (query focus) F2, a type as a synonym for a category (filter) F3, a time designation (filter) F4 and an indicator for a turbine XYZ (filter) F5.

The formal requirements specification FRS is applied to the matching unit 6. The matching unit 6 instantiates the vocabulary, rules and execution plans for the monitoring and/or control functionality. The matching unit 6 can comprise in a possible embodiment a list of formal rules annotated in SPIN that specifies the calculation of key performance indicators KPI or overall equipment efficiency OEE with reference to a given ontology. The matching unit 6 allows for example to calculate the value of a property based on other properties such as duration, check constraints and performing data validation. Further, the matching unit 6 allows to isolate a set of rules to be executed under certain conditions, for instance, to use only rules valid to calculate OEE. Further, it is possible to define complex SPARQL functions to compute the key performance indicators KPI, i.e. math expressions and their relations. Further, it is possible to translate the existing rule and execution plan into SPARQL requests, i.e. from rules to formal requests. The matching unit 6 can derive and validate a configuration deployment plan for a given input query by utilizing the most suitable software components that map to the users input request.

FIG. 6 shows an example of a simplified SPIN rule which calculates the number of event messages in which a specific event text value occurs.

The processing unit 5 implements a requirement specification element enables to convert a list of identified system constraints into a validated SPARQL request. The processing unit 5 can combine the information drawn from the ontological references (for example references to a certain turbine X or sensor Y of the automation system 1) and optional for data constraints (for example "within last week") with KPI-driven query constructs (e.g. OEE of a specific fleet).

Figures 7, 8:
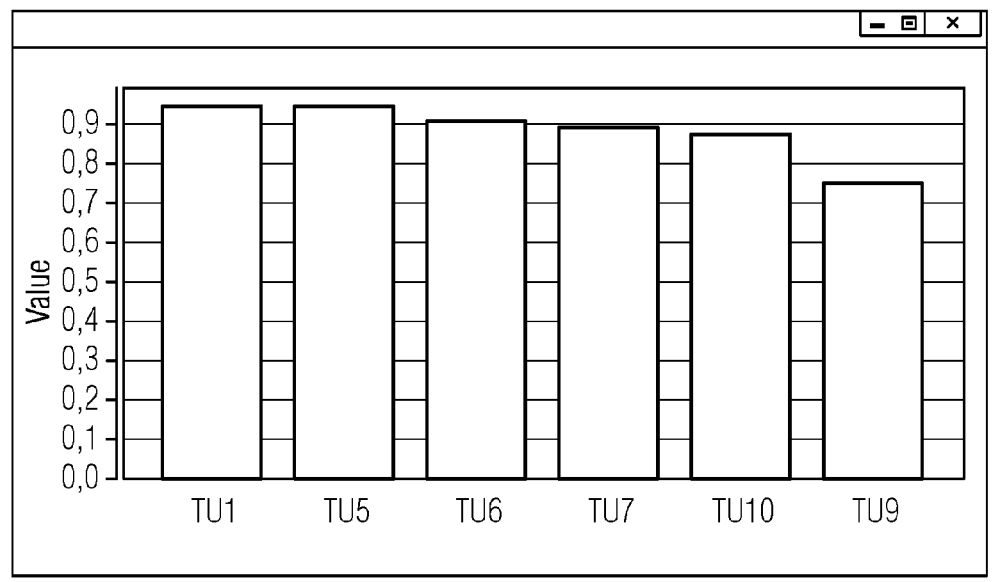
FIG. 7 illustrates an example of a simplified SPARQL instance as provided by the method and system, in accordance with embodiments of the present invention.
FIG. 8 illustrates an exemplary result representation displayed by the method and/or system, in response to a natural language statement input by a user, in accordance with embodiments of the present invention.

FIG. 7 shows an example of a simplified SPARQL instance as constructed in response to a user query: "Show me the top 10 events from turbine1 and turbine2".

The execution component 7 as illustrated in FIG. 3 can execute the formal request FRS as constructed through the previous steps against a specific knowledge base such as a RDF-based data store. On the basis of the given configuration deployment plan CD, the results can be graphically visualized to a user U as illustrated for example in FIG. 8. FIG. 8 shows as an example of a result representation showing the KPI "availability" with reference to different turbines as displayed to a user U via the user interface UI. The method and system for performing a configuration or reconfiguration of an automation system 1 do use formal background knowledge of ontologies to interpret written or spoken natural language NL statements input by a user U and translate this to the reconfiguration of the underlying control or monitoring applications of the automation system 1. The method and system according to embodiments of the present invention provides a dynamic configuration or reconfiguration mechanism for an automation system control or automation system monitoring based on natural language input.

With the method and system according to embodiments of the present invention it is possible to add additional requirements during the lifetime of the automation system 1. It is possible to formulate requirements during engineering as well as during runtime of the automation system 1. For example, dashboard elements for KPI monitoring can be dynamically added during runtime of the automation system 1.

The method and system according to embodiments of the present invention are generic with regard to the underlying control or monitoring application. While wizards have to be implemented specifically for each application, the ontology-based natural language system as used by embodiments of the present invention can be implemented only once and adapted to different applications by changing the vocabulary definitions.

The method and system according to embodiments of the present invention are intuitive for any kind of users U, in particular end users or domain experts without in-depth knowledge of the automation system 1, in particular the automation software and automation hardware of the automation system 1. End users can use their own vocabulary which can be automatically mapped to the system vocabulary. If users require additional vocabulary, an extension can be added dynamically during runtime of the automation system 1.

As the mapping of customer or user requirements to the automation system configuration can be done automatically by the method of the present invention, re-engineering does not lead to any additional efforts.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for performing a configuration or reconfiguration of applications of an automation system, the method comprising:
   (a) processing at least one natural language statement of a user requirement input by a user concerning a control and/or monitoring functionality of the automation system, based on a user ontology of the user and an automation system ontology of the automation system, to generate a formal requirements specification;
   (b) matching the generated formal requirements specification and a formal component specification read from a component library to derive a configuration deployment comprising one or more suitable components with configurations fulfilling an input user requirement; and
   (c) configuring or reconfiguring the applications of the automation system using the derived configuration deployment;
   wherein the user ontology comprises a user vocabulary used by the user for formulating a natural language statement,
   wherein the automation system ontology comprises a system vocabulary describing at least one of elements of the automation system and relations between elements of the automation system;
   wherein the method further comprises automatically aligning the user vocabulary and system vocabulary.

2. The method according to claim 1, wherein the at least one natural language statement is input by the user via a user interface in written or spoken language.

3. The method according to claim 1, wherein the component library comprises a plurality of software components each having metadata describing a functionality and/or constraints of a respective software component.

4. The method according to claim 1, wherein the generated formal requirements specification comprises a SPARQL query or a statement formalized using an OWL ontology.

5. The method according to claim 1, wherein the derived configuration deployment comprises software component read from the component library and/or at least one generated executable software component fulfilling the input user requirement.

6. The method according to claim 1, wherein the processing of the natural language statement input by the user comprises:
   splitting the natural language statement into syntactic markers and tokens;
   matching the peprassed tokens with entries in the user ontology of the user and with entries in the automation system ontology of the automation system to extract information of automation system entities mentioned in the natural language statement; and
   generating the formal requirements specification using the extracted information of the mentioned automation system entities.

7. The method according to claim 6, wherein if no entry for a token is found in the user ontology and/or in the automation system ontology, the respective token is checked against entries in a lexicon stored in a database.

8. The method according to claim 7, wherein if no entry for the respective token is found in the lexicon, possible synonyms of the token are derived and checked against entries in the lexicon.

9. The method according to claim 7, wherein after identification of the token or a synonym of the token in the lexicon, a corresponding formal rule is extracted and merged in a SPARQL query body with the information extracted from the user ontology and/or the automation system ontology to generate the formal requirements specification.

10. The method according to claim 1, wherein the configured or reconfigured monitoring and/or control applications are visualized to the user via the user interface.

11. The method according to claim 1, wherein the user is identified on the basis of the input natural language statement of the user and a corresponding user ontology is loaded from a database.

12. The method according to claim 1, wherein the at least one component of the configuration deployment calculates key performance indicators of the automation system and/or retrieves data from automation entities of the automation system and/or supplies data to automation entities of the automation system.

13. A configuration system configured to perform a configuration or reconfiguration of applications run by an automation system, the configuration system comprising:
   (a) a processing unit configured to process at least one natural language statement of a user requirement input by a user concerning a control and/or monitoring functionality of the automation system based on a user ontology of the user and/or an automation system ontology of the automation system to generate a formal requirements specification;

(b) a matching unit configured to match the generated formal requirements specification and formal component specifications read from a component library to derive a configuration deployment comprising one or more suitable components with configurations fulfilling an input user requirement; and (c) a model manager;

wherein the user ontology comprises a user vocabulary used by the user for formulating a natural language statement, wherein the automation system ontology comprises a system vocabulary describing at least one of elements of the automation system and relations between elements of the automation system, wherein the model manager is adapted to automatically align the user vocabulary and system vocabulary, and wherein the configuration system configures or reconfigures the applications run by the automation system using the derived configuration deployment.

14. An automation system comprising a plurality of automation entities and a configuration system according to claim 13, wherein the at least one component of the derived configuration deployment is configured to calculate key performance indicators of the automation system and/or to retrieve data from automation entities of the automation system and/or to supply data to automation entities of the automation system.

15. A configuration tool for an automation system, the configuration tool configured to process at least one natural language statement of a user requirement input by a user concerning a control and/or monitoring functionality of the automation system, based on a user ontology of the user and an automation system ontology of the automation system, to generate a formal requirements specification;

wherein the user ontology comprises a user vocabulary used by the user for formulating a natural language statement, wherein the automation system ontology comprises a system vocabulary describing at least one of elements of the automation system and relations between elements of the automation system;

align the user vocabulary and system vocabulary automatically;

match the generated formal requirements specification and a formal component specification read from a component library to derive a configuration deployment comprising one or more suitable components with configurations fulfilling an input user requirement; and configure the automation system using the derived configuration deployment.

* * * * *